E. YOUNG.

Gate.

No. 66,663.

Patented July 9, 1867.

United States Patent Office.

EBENEZER YOUNG, OF CAMDEN CENTRE, MICHIGAN.

Letters Patent No. 66,663, dated July 9, 1867.

---

IMPROVEMENT IN GATES.

---

The Schedule referred to in these Letters Patent and making part of the same.

---

TO ALL WHOM IT MAY CONCERN:

Be it known that I, EBENEZER YOUNG, of Camden Centre, in the county of Hillsdale, and State of Michigan, have invented a new and improved Gate; and I do hereby declare that the following is a full, clear, and exact description thereof, which will enable others skilled in the art to make and use the same, reference being had to the accompanying drawings, forming part of this specification, in which—

Similar letters of reference indicate like parts.

My invention has for its object to furnish an improved gate, so constructed and arranged that it may be raised and will remain suspended so as to swing over snow or other obstructions, and so that its forward end may be lowered to rest upon the ground and hold the gate stationary in any position in which it may be placed; and it consists in the combination of the upright bar, pivoted bars, and catch-lever, with each other, and with the gate, as hereinafter more fully described.

Figure 1:
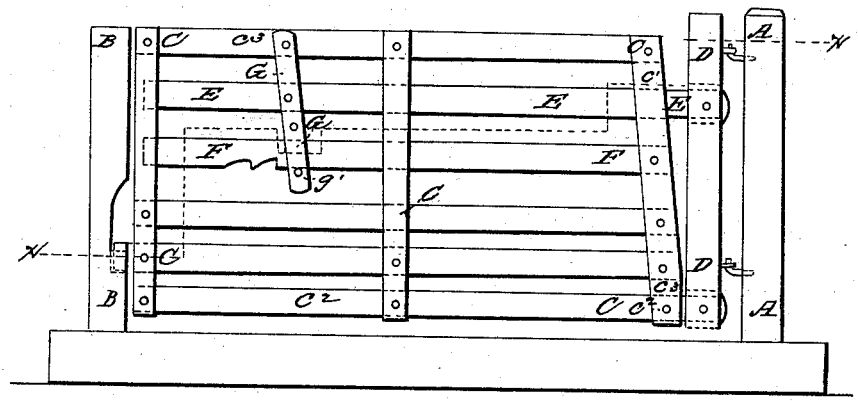
Figure 1 is a side view of my improved gate.
Figure 2:
Figure 2 is a detail sectional view of the same taken through the line $x\ x$, fig. 1.

A is the rear gate-post, to which the gate is hinged. B is the front gate-post, and C is the gate, the rear cross-bar $c^1$, of which inclines forward so that the lower part of the gate is a little longer than the upper part, as shown in fig. 1. D is an upright bar to which the hinges are attached, the lower end of which is pivoted to the projecting end of the lower horizontal bar $c^2$ of the gate. E is a horizontal bar, the rear end of which is pivoted to the upper part of the upright D, and which passes through the gate and works loosely therein. F is a horizontal bar, the rear end of which is pivoted to the rear cross-bar $c^1$, and the remaining part of said bar works loosely in the said gate. G is a lever formed by two short bars placed upon opposite sides of the horizontal bars of the gate. The lever G is pivoted to the bar $c^3$ of the gate and to the bar E, and has a pin or handle, $g'$, passing through its lower end upon which the pivoted bar F rests. The lower edge of the bar F has several notches formed in its lower edge for the pin or handle $g'$, of the lever G, to take hold of. The forward end of one of the lower horizontal bars of the gate projects forward so as to act as a latch to fasten the gate shut. By raising the forward end of the gate it slides back upon the bar E; this pushes the lower end of the lever G forward so that the pin $g'$ may catch upon one or the other of the notches in the bar F, according as the forward end of the gate is raised more or less, so that the gate may be held securely in that position while being swung open or shut; or the same effect may be produced by pushing the lower end of the lever G forward. When the gate has been swung into the desired position, by slightly raising the forward end of the bar F the lower end of the gate will drop to the ground, retaining the gate securely in that position.

I claim as new, and desire to secure by Letters Patent—

The combination of the upright bar D, pivoted bar E, lever G, and pivoted bar F, with each other, and with the gate C, substantially as herein shown and described and for the purpose set forth.

EBENEZER YOUNG.

Witnesses:
DELVILL BRYANT,
JOB YOUNG.